J. H. AUBLE.
TRANSMISSION GEARING.
APPLICATION FILED OCT. 30, 1911.
1,145,826.
Patented July 6, 1915.
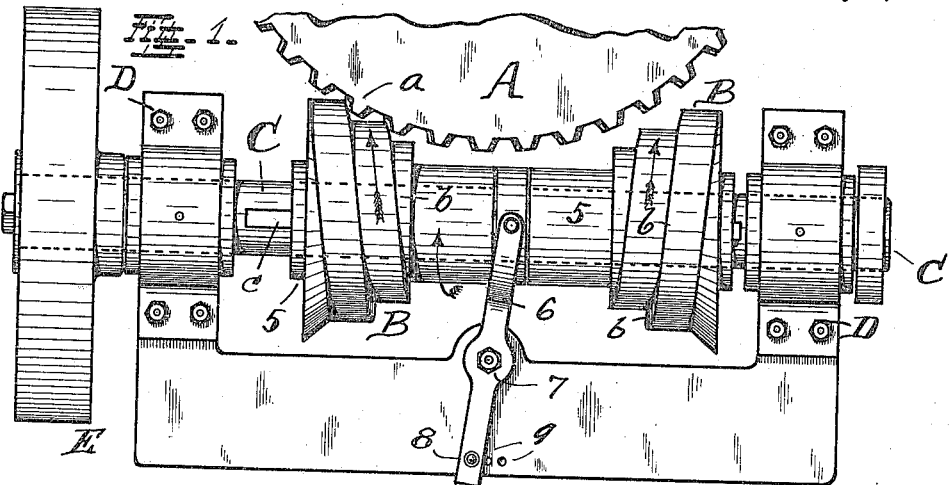
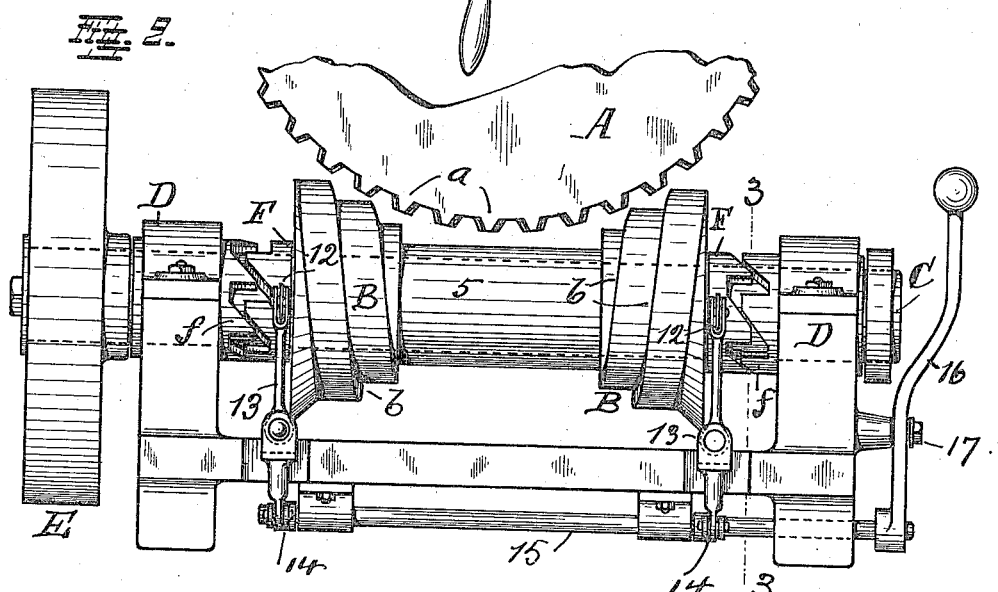
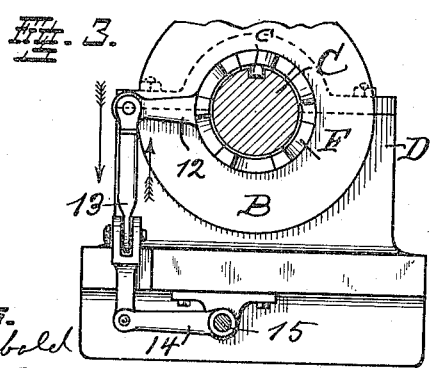
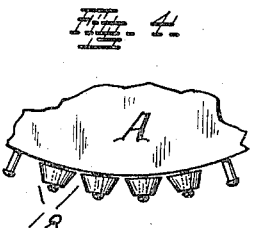
Witnesses.
A. D. Archibald
T. LeBeau
Inventor:
James H. Auble
by C. Spengel atty

UNITED STATES PATENT OFFICE.

JAMES H. AUBLE, OF CINCINNATI, OHIO, ASSIGNOR OF ONE-HALF TO HARRY A. BARRETT, OF CINCINNATI, OHIO.

TRANSMISSION-GEARING.

1,145,826.   Specification of Letters Patent.   Patented July 6, 1915.

Application filed October 30, 1911. Serial No. 657,559.

*To all whom it may concern:*

Be it known that I, JAMES H. AUBLE, a citizen of the United States, and residing at Cincinnati, in the county of Hamilton and State of Ohio, have invented certain new and useful Improvements in Transmission-Gearing; and I do declare the following to be a full, clear, and exact description of the invention, attention being called to the drawing which accompanies this application and forms a part thereof.

This invention relates to gearing in which one rotary gear-element is used to transmit motion to another gear-element positioned so as to rotate in a plane parallel to the axis of the transmitting element, and in a manner similar to that which exists in worm-gearing and where the extent of engagement possible between the interacting elements is likewise limited by presumed conditions existing.

The novel feature of this invention by which it distinguishes however against worm-gearing consists of the construction whereby rotation of the driven gear-element may be started and stopped, and had in either direction by an adjustment which permits the necessary change to be made quickly and easily without interfering with the rotation of the transmitting element or its shaft, nor requiring change of direction of such rotation, nor being subject to any interference by resistance from the driven element. The advantage which results from this arrangement is that in case said transmitting element or its shaft is involved in the operation of other and independent machine-elements which have no connection with the operation of the driven gear-element, the operation of these independent machine-elements may continue and is not interfered with, irrespective of whether the rotation of said driven gear-element is started, stopped or changed in direction.

In the following specification and particularly pointed out in the claims at the end thereof, will be found a full description of my invention, together with its operation, parts and construction, which latter is also illustrated in the accompanying drawing, in which:—

Figure 1, illustrates my invention in a view which may be considered either a top-view or a front-view, according to the position in which the device is used and which may be done to suit conditions. Fig. 2, in a similar view shows a modified construction of the adjusting means. Fig. 3, shows a sectional side-view of these means, taken on line 3—3 of Fig. 2. Fig. 4, shows a modified construction of one of the parts.

In the drawing, A indicates a portion of the gear-element to which rotary motion is to be transmitted in order to produce thereby a certain mechanical effect for a certain particular purpose whatever it may be. It is accordingly mounted upon a shaft or connected to another machine-element to be operated and used to suit the particular requirements. For transmitting this motion to element A, two elements B are used, one being used if rotation of element A in one direction is needed, and the other being used when rotation in opposite direction is required. Conditions are presumed permitting only a limited part of the periphery of element A to be encumbered by engagement with these elements B, for which reason they are arranged as shown in the drawing, and so as to leave the larger part of the periphery of element A, as well as its sides unencumbered and available for practical uses. These elements B are mounted upon and rotated by a shaft C, suitably supported in bearings D, and rotated in one direction by a machine-element E, which may be a pulley or a gear-wheel. These elements B, are substantially cone-frustums and each is stepped to form between its parallel ends a helical shoulder *b*, arranged at a substantially right angle to the axis of the element. These shoulders are so disposed around the conical side of the elements as to form an inclined step, which extends continuously from one of said parallel ends to the other, while following the constantly varying shape and diameter of the element. The shoulders of both elements face each other and the axial inclination of the shoulder of one element is opposite to that of the shoulder of the other element.

Element A is provided with teeth *a* in its face and is rotated when said teeth are engaged by shoulder *b* of an element B, the engagement being one of lateral contact.

The action whereby an element B transmits motion to element A, consists of its shoulder *b* being carried progressively against one side of teeth *a*, one after the other, so that these latter are displaced at a rate proportional to the helical pitch of said shoulder thereby imparting rotation to element A. This rotation of element A, as to starting and stopping, is controlled by adjusting the position of the transmitting element and this may be done, in one of the various ways employed in the construction of machinery. A clutch may be used, or said element may be shifted laterally on shaft C or this latter, together with said element, may be shifted in its bearings D, to make or break contact between shoulder $b$ and teeth $a$. I prefer however, to control rotation of element A by means of a lateral shift of elements B, which may be had by moving them on shaft C, or by moving this latter with said elements in its bearings. Rotation of shaft C is not affected and may continue without interruption if such is required for any reason, as for instance in case it, or its actuating means are concerned in the operation of other and independent machine-elements which have no connection with the operation of element A.

As shown in the drawing, the step $b$ of one element is inclined in a direction opposite to that of the other element so that, said elements rotating in one direction as shown by arrows, element A will be rotated either in one or the other direction according to which one of elements B is in contact with teeth $a$. One side only of teeth $a$ is engaged at the time, one side always by one particular element and the other side by the other element.

By changing the angle of inclination of the shoulder of one frustum, or what is the same, the pitch of the shoulder thereon with reference to the pitch of the shoulder of the other frustum, the speed of the driven element A, when rotated in one direction by one frustum, may be arranged to be different from the speed when rotated in the other direction by the other frustum.

For the purpose of adjusting the position of elements B with reference to element A, it is preferable to so connect them that both may be moved simultaneously, they being at the same time so spaced that one only may be in engagement with element A, as shown in Fig. 1. They are further so spaced that they may also occupy an intermediate position as shown in Fig. 2, in which none of them is in engagement with element A, and no motion whatever is transmitted to this latter.

The depth of steps $b$ is such that their bottoms, or what is the same, the side of elements B, is cleared by teeth $a$ of element A as they rotate past, permitting also each element to be moved with its step laterally against the side of teeth $a$ to effect driving contact, or to be backed away therefrom to break such contact. Unless elements B are rigidly connected to shaft C and shifted with this latter by the aforesaid adjustment, splines are used to maintain operative connection between shaft C and elements B while they are shifted on the shaft and in order to permit adjustment of both elements by one manipulation they are rigidly mounted upon a sleeve 5, which is operatively connected to shaft C by a spline $c$. For so moving the driving structure which comprises the connected elements B B, to adjust them with reference to element A, various contrivances may be used. It may be done as shown in Fig. 1, by means of a forked lever 6, pivoted at 7, the arrangement and construction being analogous to a clutch-lever. Inasmuch as the action of elements B and the re-acting stress of element A, is in a direction substantially parallel to the axis of shaft C, it becomes necessary to firmly lock the adjusted driving structure against endwise movement and to hold it in engagement with teeth $a$. As shown in Fig. 1, this may be done by locking lever 6 in its adjusted position by means of a pin 8, which occupies an opening in said lever and is seated in either one of three openings 9. When lever 6 is locked with this pin in the central one of openings 9, neither one of elements B is capable of engaging element A and this latter is at rest as shown in Fig. 2. When the resistance of element A is considerable, a more substantial manner of holding elements B in adjusted working position is required. This I obtain by wedging means and the preferable arrangement is one in which the adjusting means serve at the same time as means for the purpose of holding the driving structure in position after adjustment. These means consist of wedge-rings F, loosely mounted opposite each end of the driving structure and longitudinally confined between these ends, and of shoulders $f$ which are rigidly held in position. They may be connected for such purpose to the shaft-supports D. The opposite surfaces of rings F and shoulders $f$ are shaped as shown, that is provided with spaced wedge-formations, presenting inclined surfaces in engagement with each other. Each ring is provided with an arm 12 and connected by links 13 to other arms 14, mounted upon a rocker-rod 15. A handle 16 serves to manipulate rod 15. Both wedge-rings always move together rotarily and at the same time axially, shoving by this latter movement the driving structure either to the right or to the left according to the direction in which lever 16 is manipulated, one ring however only doing the work.

Referring to Figs. 2 and 3, if lever 16 is moved to pull links 13 down (see arrow in Fig. 3) the wedge-ring on the left (Fig. 2) is moved against the wedge-formation of shoulder $f$ and forced to the right, thereby shoving the driving structure accordingly to the right and in contact with teeth *a*. The wedge-ring on the right moves at the same time, but ineffectively since its wedge-formations move away from the complementary formations of the opposite shoulder and into the spaces between them, which movement prevents this ring from resisting the movement proceeding from the left and due to the action of the other ring. If lever 16 is moved in the opposite direction, the wedge-ring on the right becomes active and shifts the driving structure to the left. Lever 16 may be locked in position by a pin 17 whereby the wedge-rings become locked in position and firmly hold the driving structure between them, both rings participating in this function. Teeth *a* may also be formed by means of rollers 18, mounted on the face of element A, as shown in Fig. 4.

Having described my invention, I claim as new:

1. In transmission gearing, the combination of a drive-shaft, a toothed gear-element supported to rotate in a plane parallel to the axis of this shaft, two spaced driving elements connected to rotate with said shaft and axially adjustable, they being each in shape of a cone-frustum which is stepped to form between its parallel ends a helical shoulder arranged at a substantially right angle to the axis of the element and disposed around the conical side of the same to form an inclined step which extends continuously from one of said parallel ends to the other while following the constantly varying shape and diameter of the element, the shoulders of both elements facing each other, the inclination of the shoulder of one element being opposite to that of the shoulder of the other element, the shoulder of one driving element being adapted to engage the teeth of the driven element on one of their sides, while the shoulder of the other driving element is adapted to engage the other side of said teeth, the engagement being that of a thrust acting in the direction of the axis of the drive shaft, the distance between the driving elements being one considerably limited as against the length of diameter of the driven element and means to adjustably position said driving elements, each with reference to the particular side of the teeth which it is adapted to engage.

2. In transmission gearing, the combination of a driving-shaft, a sleeve splined thereto, a driven gear-element supported with its toothed face opposite the sleeve, two driving-elements rigidly mounted upon said sleeve with a space between them, they being each in shape of a cone-frustum and each stepped to form between its parallel ends a helical shoulder arranged at a substantially right angle to the axis of the element and disposed around the conical side of the same to form an inclined step which extends continuously from one of said parallel ends to the other while following the constantly varying shape and diameter of the element, the shoulders of both elements facing each other, the axial inclination of the shoulder of one element being opposite to that of the shoulder of the other element, the shoulder of one driving element being adapted to engage the teeth of the driven element on one of their sides while the shoulder of the other driving-element is adapted to engage the other side of said teeth, the engagement being that of a thrust acting in the direction of the axis of the drive-shaft, the distance between the driving elements being one considerably limited as against the size of the diameter of the driven element and means to adjustably hold the sleeve with the driving elements on the shaft, so that none, or either one only of the driving elements is in engagement with the teeth of the driven element.

3. In transmission gearing, a driving element which is stepped to form between its ends a helical driving shoulder the surface of which, considered in a radial direction, is disposed substantially at right angles to the axis of the element, it also following circumferentially the conical side thereof so as to form an inclined step of constant width which extends between the ends of the element.

In testimony whereof, I hereunto affix my signature in the presence of two witnesses.

JAMES H. AUBLE.

Witnesses:
C. SPENGEL,
T. LE BEAN.